Nov. 5, 1963 G. T. SCHJELDAHL ETAL 3,109,440
AIR SUPPORTED STRUCTURE
Filed Jan. 11, 1960
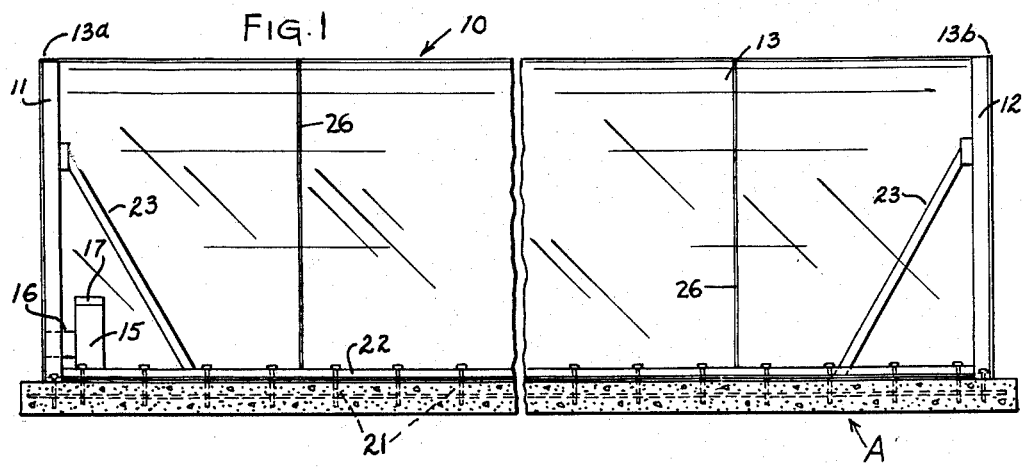
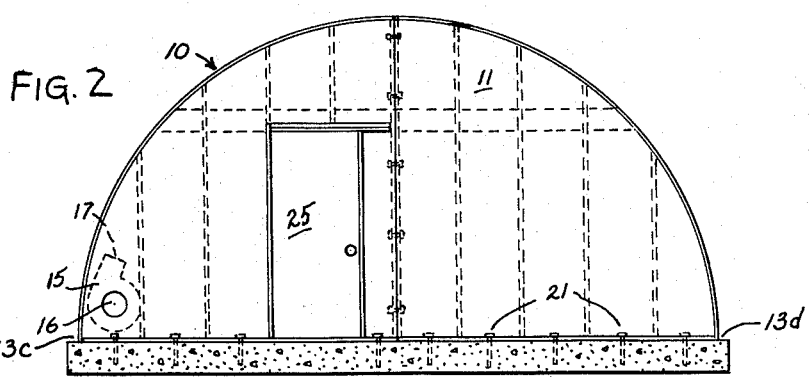
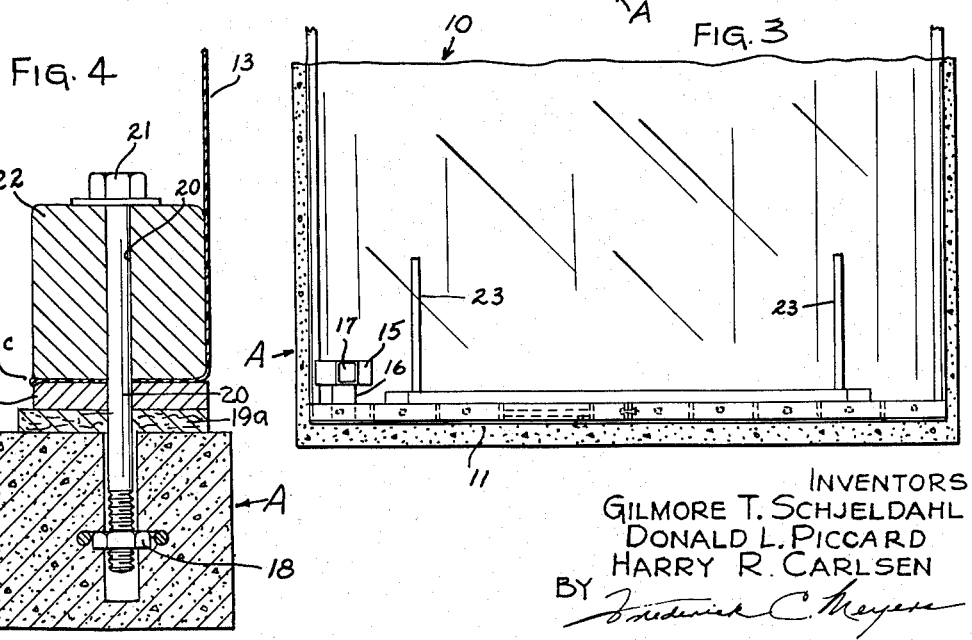
INVENTORS
GILMORE T. SCHJELDAHL
DONALD L. PICCARD
HARRY R. CARLSEN
BY
ATTORNEY

United States Patent Office 3,109,440
Patented Nov. 5, 1963

3,109,440
AIR SUPPORTED STRUCTURE
Gilmore T. Schjeldahl, Donald L. Piccard, and Harry R. Carlsen, Northfield, Minn., assignors to G. T. Schjeldahl Company, Northfield, Minn., a corporation of Minnesota
Filed Jan. 11, 1960, Ser. No. 1,764
5 Claims. (Cl. 135—1)

This invention relates to an air supported structure, and more particularly to an inflated plastic film structure.

Plastic films such as polyethylene and the like have been used in prior art devices such as balloons, and other air supported buildings. Structural failures in the above type of devices are generally occasioned by a multi-directional loading of the plastic film.

We have found that plastic film can be air supported as a building in such manner to avoid multi-directional loading and that only lateral stresses act on the plastic film. To enclose a building formed of plastic film, solid end wall construction is utilized. The end walls are self-supporting and are braced to absorb the longitudinal forces created by the air pressure acting on the plastic film. The plastic film, however, is subjected to lateral stresses only, and, thus, it is possible to construct plastic film structures of almost infinite length. The end wall construction is a simple way of enclosing the plastic film, and further, the end walls offer a working surface in which doors or entrances can be constructed easily and economically.

It is therefore an object of our invention to provide an elongate structure of plastic film supported by air pressure wherein the film is not stressed longitudinally regardless of the length of the structure.

It is another object of our invention to provide an air supported structure of plastic film having a wall at each end wherein there is no loading on the end walls from the plastic film, and wherein said end walls are capable of withstanding the longitudinal forces of the air pressure.

It is a further object of our invention to provide an air supported structure wherein a sheet of plastic film is secured to a base in such manner as to allow said film to inflate to form a configuration having no longitudinal stresses.

It is still another object of our invention to provide a segmented sheet of plastic film wherein the segments of plastic are joined in such manner that the segmental juncture is not subjected to longitudinal stresses.

These and other objects and advantages of our invention will more fully appear from the following description, made in connection with the accompanying drawings, wherein like reference characters refer to the same or similar parts throughout the several views and in which:

FIGURE 1 is a side elevational view of our air supported structure;
FIGURE 2 is an end view of the structure of FIG. 1;
FIGURE 3 is a partial top plan view of the structure of FIG. 1; and
FIGURE 4 is a detail of securement means for the structure taken at 4—4 of FIG. 1.

With continued reference to the drawings, FIG. 1 discloses a structure 10 constructed with end walls 11 and 12 and an elongate sheet of plastic film 13. The plastic film 13 is supported by air pressure from air fan 15. The outward edges 13a and 13b of plastic film 13 are joined to end walls 11 and 12 respectively. The joinder of the plastic film to the end walls is not necessary for the support of the plastic film, but rather the joinder prevents excessive air leakage.

The low pressure air fan 15 is mounted with the suction element 16 extending through end wall 11 to bring outside air to the interior of plastic film structure 10. The air is discharged at opening 17, and maintains a pressure of from 2 to 3 inches of water inside the structure 10. The pressure is sufficient to maintain the semicircular cross-section of the structure 10 through its length.

It is important that the longitudinal edges 13a and 13b of the plastic film be secured to the ground or to a foundation as the stresses imparted within the structure act laterally upon the plastic film and collectively exert a large total force. For example, a slit normal to the foundation would have little effect, but a slit parallel to the foundation would tend to open and propagate. The film 13, however, can be formed with oriented fiber or be so reinforced transversely to the length as to avoid such propagation of ruptures. No special care need be taken with respect to reinforcement of the film in a longitudinal direction. In FIGS. 1, 2 and 4 a concrete foundation A is provided in which a plurality of bolt receiving means 18 is embedded. An elongate wooden member 19 and a pressure pad 19a overlies said foundation and is provided with a plurality of openings 20 to receive bolts 21. The plastic film 13 overlies the member 19 along the longitudinal side of said structure and another elongate member 22 is placed over the plastic film where it joins the foundation structure, and by passing a plurality of bolts 21 through members 19, 19a and 22 to threadably engage means 18 embedded in the foundation A, the plastic film 13 is secured longitudinally along the foundation and resists the upward and lateral movement of the entire plastic film occasioned by the air pressure within the structure.

The plastic film 13 is secured at edges 13c and 13d between members 19 and 22. The pressure pad 19a assures alignment of the member 19 on foundation A to prevent air leakage between member 19 and foundation A. Also the member 22 is drawn down tightly on the plastic film and member 19 to assure a continual securement of the plastic film in a straight line along members 22.

The end walls 11 and 12 may be held in position by cables or turn-buckles 23 as the forces acting against the end walls are the longitudinal forces of air pressure acting on the entire area of the end walls. The stress must be taken entirely by the end walls so that there is no longitudinal stress on the plastic film. In this way there is no loading of the end walls by the plastic film, and, as a consequence it does not matter what lineal distance exists between end walls 11 and 12, for the air pressure would tend to maintain the shape of the structure even without the presence of end walls 11 and 12.

The end walls 11 and 12 usefully enclose the ends of the elongate plastic film structure, and in such end walls, a door 25 may be easily installed for entrance and exit from the structure 10.

In particular a supported end wall needs only to enclose the ends and be capable of withstanding the air pressure exerted against its surface area, and, of course, should have sufficient strength to resist wind loads acting exteriorly of the structure.

The joinder of the plastic film to the outer periphery of the semi-circular end walls retains the air pressure within the structure, but the plastic film is supported by air pressure and not by the end walls in a way that would create longitudinal forces. The stressing of the plastic film is entirely lateral.

The absence of component forces in a longitudinal direction precludes the concentration of forces along the foundation, but rather the total force is distributed uniformly along each of the elongate wooden members 22 for the entire length of the building. Pressures in the order of many tons total force can thus be applied by compressed supporting air with virtually no variation in the unit pressure along the foundation structure, as long as the plastic film is securely and accurately held in a straight line for the entire length of the foundation.

It is possible that plastic film 13 might not be a continuous sheet but rather might be constructed of segments having their edges joined in seams 26 running transverse of the longitudinal extent of the structure. Such seams joining such segments would not be subjected to longitudinal stresses and thus the seam need not be made to withstand the high lateral stresses.

It will, of course, be understood that various changes may be made in the form, details, arrangements and proportions of the parts without departing from the scope of our invention as set forth in the appended claims.

What we claim is:
1. An air supported building comprising,
   (a) a base,
   (b) a pair of upstanding end walls positioned with confronting inner surfaces in spaced relation upon said base,
   (c) each of said end walls being substantially rigid and having a continuous outwardly convex edge extending from one side of the building to the other,
   (d) a bracing structure interconnecting said end walls and said base and adapted to counteract air pressure exerted against said inner confronting surfaces and to maintain said rigid end walls in their upstanding relation,
   (e) a continuous flexible plastic sheet joined to said end walls at their respective outwardly convex edges and having downwardly and outwardly curved sides terminating in spaced lower edges at said base,
   (f) means securing in air tight relation each of said lower edges to said base for the length of said sheet, and
   (g) means adapted to exert an air pressure greater than atmospheric within said building, the end walls absorbing substantially all of the longitudinal stresses and said sheet absorbing the remaining lateral stresses.

2. The structure set forth in claim 1 wherein said edges are semi-circular.

3. The structure set forth in claim 1 wherein said base is rectangular and said end walls are parallel.

4. The structure set forth in claim 1 wherein the vertical cross-sectional configuration of said sheet is constant throughout its length.

5. The structure set forth in claim 1 wherein said convex edges cooperatively form an air seal with the ends of said sheet.

References Cited in the file of this patent
UNITED STATES PATENTS

| | | |
|---|---|---|
| 2,129,932 | Huddleston | Sept. 13, 1938 |
| 2,415,202 | Ferguson | Feb. 4, 1947 |
| 2,731,055 | Smith | Jan. 17, 1956 |
| 2,733,482 | Doman et al. | Feb. 7, 1956 |
| 2,910,994 | Joy | Nov. 3, 1959 |
| 2,915,074 | Cameto | Dec. 1, 1959 |
| 2,948,286 | Turner | Aug. 9, 1960 |